United States Patent [19]

Scalliet et al.

[11] Patent Number: 5,439,489
[45] Date of Patent: Aug. 8, 1995

[54] METHOD AND APPARATUS FOR PRODUCING A FUEL COMPOSITION

[75] Inventors: Robert M. Scalliet, Houston; Raymond R. Ruth, Pearland; Craig A. Koopersmith, Spring, all of Tex.

[73] Assignee: Scaltech, Inc., Houston, Tex.

[21] Appl. No.: 292,165

[22] Filed: Aug. 17, 1994

Related U.S. Application Data

[63] Continuation of Ser. No. 83,920, Jun. 28, 1993, abandoned.

[51] Int. Cl.$^6$ .................................................. C10L 7/02
[52] U.S. Cl. ................................................ 44/281; 44/311; 210/769
[58] Field of Search ........................ 44/281, 300, 311; 210/769

[56] References Cited

U.S. PATENT DOCUMENTS

| | | | |
|---|---|---|---|
| 3,304,991 | 2/1967 | Greenfield | 44/311 |
| 4,378,229 | 3/1983 | Leen | 44/311 |
| 4,622,152 | 11/1986 | Resing | 210/769 |
| 4,810,393 | 3/1989 | Guinard . | |
| 4,931,176 | 6/1990 | Guinard . | |
| 5,141,526 | 8/1992 | Chu | 44/576 |

Primary Examiner—Jacqueline V. Howard
Attorney, Agent, or Firm—Browning, Bushman, Anderson & Brookhart

[57] ABSTRACT

A process for producing a fuel composition from a waste stream containing a liquid, organic component, water and a mixture of inorganic and organic solids wherein the waste stream is separated into an oil fraction, a water fraction and a solids fraction, the solids fraction being de-watered to produce a de-watered solids fraction containing less than about 60% by weight water, the de-watered solids fraction being admixed with oil and heated in a heating apparatus wherein the de-watered solids fraction and oil are subjected to heat exchange conditions at a temperature and for a time sufficient to evaporate water and produce a fuel composition containing less than about 15% by weight water, the apparatus having means for inducing forced convection condition in the mixture of de-watered solids and oil to prevent solids settling and enhance heat exchange heating.

5 Claims, 1 Drawing Sheet

METHOD AND APPARATUS FOR PRODUCING A FUEL COMPOSITION

This is a continuation of U.S. application Ser. No. 08/083,920, filed on Jun. 28, 1993, now abandoned.

FIELD OF THE INVENTION

The present invention relates to a method and apparatus for producing a fuel composition from a waste stream such as a petroleum refinery waste stream.

BACKGROUND OF THE INVENTION

Waste product streams containing primarily water, and smaller amounts of non-aqueous liquids and solids, both organic and inorganic, are by-products of the refining, petrochemical and chemical industries, to name a few. For example, a typical waste stream from a refinery operation will contain about 80% by weight water, about 15% by weight oil, e.g., hydrocarbons and other non-aqueous, generally water-insoluble liquids, and about 5% by weight solids. Due to environmental regulations, these waste streams pose disposal problems. It is known to treat a refinery waste stream, commonly referred to as a sludge, which is a mixture of solids, water and oil products, in such manner as to obtain either a solids stream that is a slurry of solids, both organic and inorganic, in a primarily liquid (aqueous or non-aqueous) medium, the slurry generally containing from about 15 to about 20% by weight solids content, or a non-pumpable solids cake. Such slurries can be incinerated, as for example, in furnaces used for acid regeneration in cement kilns or the like. These prior art slurries have several disadvantages. For one, because of the water content, they have a low heat value. Additionally, the solids content of the slurries cannot exceed about 20–25% lest they become so viscous as to be unpumpable at ambient temperature conditions. Accordingly, the cost of disposal of the slurries is increased because the transportation cost per unit weight of solids is relatively high. In the case of non-pumpable solid cake, the solids content is generally 25–90% by weight. Disposal of this cake requires special handling and poses disposal costs considerably greater than that posed by the disposal of the slurries.

In co-pending application Ser. No. 07/924,828, filed Aug. 4, 1992, and incorporated herein by reference for all purposes, there is disclosed a fuel composition that can be made using the process and apparatus of the present invention. One of the problems presented in producing the fuel composition disclosed in the aforementioned co-pending patent application is that it is necessary, in order to obtain a fuel composition having suitable heat value, to remove water from a mixture of solids, oil and water. One, prior art way of accomplishing this is to take a de-watered cake containing solids, oil and some water and heat the de-watered cake in a dryer to evaporate water. However, because of the solid nature of the cake, which has poor heat transfer characteristics, the evaporation efficiency of water is greatly reduced. Furthermore, use of this method generally results in loss of oil (hydrocarbon) vapors, which presents an environmental problem if the vapors escape to atmosphere and in any event results in a loss of combustible components that are desired to enhance the heat value of the fuel composition.

SUMMARY OF THE INVENTION

It is therefore an object of the present invention to provide a process for providing a fuel composition derived from a waste stream.

Another object of the present invention is to provide a process for providing a pumpable fuel composition derived from a waste stream containing water, non-aqueous liquids, inorganic solids and organic solids.

Still a further object of the present invention is to provide a process for providing a pumpable fuel composition of a relatively high solids content that can be disposed of more economically.

Another object of the present invention is to provide an apparatus that can be used to produce a fuel composition from a feed charge containing water, non-aqueous, generally water-insoluble liquids and a mixture of inorganic and organic solids.

According to the process of the present invention, a waste stream containing a liquid, organic component, water and a mixture of inorganic and combustible organic solids is separated into a liquid, organic fraction, a water fraction and a solids fraction. Water is removed from the solids fraction to produce a de-watered solids fraction containing less than about 60% by weight water. The de-watered solids fraction is mixed with oil to produce a feed charge, the feed charge being heated using heat exchange conditions at a temperature and for a time sufficient to evaporate water and produce a fuel composition containing less than about 15%, preferably less than about 10%, by weight water. The heating of the feed charge is conducted under forced convection conditions to prevent solids settling and facilitate uniform heat exchange.

The apparatus of the present invention comprises a means or housing defining a vessel for containing a feed charge comprised of solids, oil and water and providing a vapor space above the level of the feed charge. The vessel includes at least one inlet for introduction of components of the feed charge and at least one outlet for removal of fuel composition produced in the vessel. The vessel is provided with a vent for removal of vaporized feed charge, e.g., water. There are means in the vessel for introducing a heated fluid into the vessel to provide heat exchange heating of feed charge present in the vessel. The apparatus further comprises means disposed in the vessel to induce forced convection conditions in the feed charge.

DESCRIPTION OF THE PREFERRED EMBODIMENT

Figure 1:
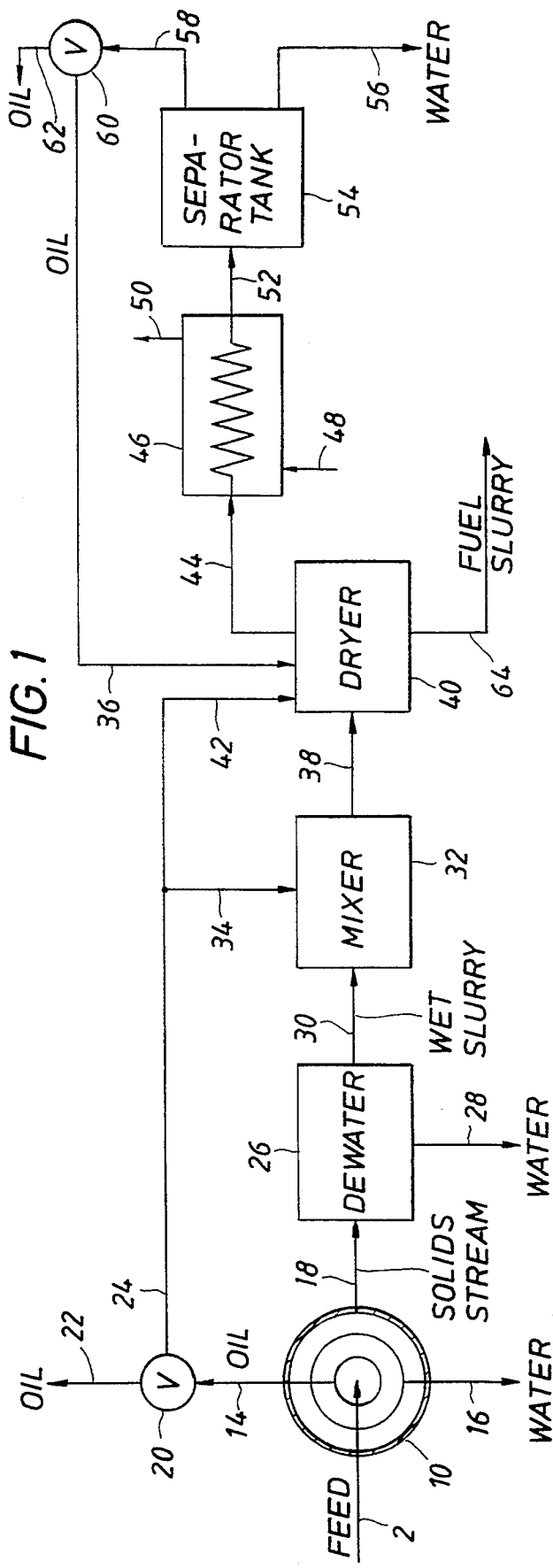
FIG. 1 is a schematic flow diagram of the process of the present invention.

The apparatus and process of the present invention provide a means whereby a fuel composition derived from a waste stream can be prepared. Indeed, as disclosed in co-pending application Ser. No. 07/924,828, fuel compositions prepared using the process and apparatus of the present invention can have a minimum heat value of at least about 7000 Btu/lb., preferably greater than about 10,000 Btu/lb.

The process and apparatus of the present invention can be used to derive fuel compositions from refinery waste streams. Such streams can include, for example, API separator sludge, dissolved air flotation float (DAF), slop oil emulsion solids, tank bottoms, heat exchanger bundle cleaning sludge, oily waste sludges from the refinery's primary side of the waste water treatment system, oily tank bottom sludges, etc. However, the source or feed stream used in the process of the present invention need not be a waste stream from a refinery. For example, in numerous petrochemical and chemical operations, municipal operations and the like, waste streams, primarily aqueous in nature, are produced. All of these waste streams pose the same or similar disposal problems as refinery waste streams in that they contain hazardous solids and non-aqueous liquids. In general, the process of the present invention can process any waste stream that contains "an oily component." The term "oily component" is intended to include materials that are organic in nature and is generally a mixture of combustible, water-insoluble organic compounds, i.e., it is a liquid, organic component of the waste stream. Such organic compounds can include hydrocarbons, both aliphatic and aromatic, as well as other organic compounds containing oxygen, nitrogen and sulfur such as ketones, carboxylic acids, aldehydes, ethers, sulfites, amines, etc. Generally, especially in the case of waste streams or products produced in the refining of petroleum, hydrocarbons are the principal components of the organic materials.

The waste streams that are processed according to the present invention are commonly referred to as sludges and are a mixture of water, organic compounds and solids, both inorganic and organic in nature. The waste streams or sludges can vary widely in composition. For example, a typical sludge or waste stream can contain from about 5 to about 80% by weight liquid, organic component, from about 10 to about 95% by weight water and from about 1 to about 30% by weight solids. The liquid, organic component, commonly referred to as "oil," can comprise, as noted, a myriad of organic compounds ranging from hydrocarbons to other organic compounds mentioned above. The liquid, organic component or oil includes not only compounds that are normally liquid at ambient temperature, but organic compounds that are solid at ambient temperature but are soluble in organic liquids and hence are present in the liquid, organic component of the waste stream.

The liquid, organic component is referred to as "oil" since, for the most part, it is comprised of combustible organic compounds or products (usually primarily hydrocarbons) that are or tend to be insoluble or immiscible in water. Thus, the term "oil" includes the liquid, organic component or fraction thereof, as well as liquid or liquified organic compounds as described above from any source. The solids in the waste products or streams comprise suspended carbonaceous matter together with varying quantifies of non-combustible materials including silt, sand, rust, catalyst fines and other, generally inorganic, materials. The organic solids are carbon-containing compounds that are substantially methylene chloride insoluble but, because of their carbon content, are usually combustible. In certain cases, the solids content can be substantially all organic, i.e., carbon-containing, or all inorganic.

The process and apparatus of the present invention provide a means whereby a fuel composition, if desired, can be produced solely from a waste stream, e.g., refinery sludge, in such a manner that obviates the use of typical, prior art drying techniques to reduce the water content of the feed charge used to produce such fuel compositions, thereby minimizing loss of hazardous vapors to the atmosphere, minimizing loss of high Btu content fuel components from the fuel composition and utilizing readily available heat via heat exchange conditions to provide the energy for evaporating the water from the feed charge used to produce the fuel composition.

Reference is now made to FIG. 1 for a description of a preferred mode of carrying out the process of the present invention. A vertical disk centrifuge 10 receives a waste (feed) stream from line 12. The centrifuge 10 separates the waste stream into an organic fraction (oil) that exits centrifuge 10 via line 14, an aqueous fraction (water) that exits centrifuge 10 via line 16 and a solids fraction (wet sediment) that exits centrifuge 10 via line 18. The water removed via line 16 is substantially free of organic compounds and solids and can be recycled for further use in the refinery or, if desired, can be sent to disposal. The oil exiting line 14 passes through two-way valve 20, where it can be recycled via line 22 for further processing. Alternately, or in addition, and as will be seen hereafter, a portion of the oil can pass via valve 20 and line 24 for further use in the process of the present invention.

To reduce the water content of the wet sediment or solids fraction exiting centrifuge 10 via line 18, it is de-watered (if necessary) in de-watering apparatus 26. De-watering apparatus 26 can be any apparatus for separating solids and liquids such as, for example, filtration equipment. Thus, the de-watering apparatus 26 can comprise a filter press, continuous vacuum filters such as drum filters, disk filters, horizontal filters such as table filters, pan filters and belt filters, belt presses, centrifugal separators, etc. De-watering apparatus 26 can also comprise a simple settling tank that allows the solids to concentrate in a thickened slurry that is removed as desired. Generally speaking, the solids fraction or wet sediment introduced into de-watering apparatus 26 will comprise, by weight, 80–98% water, some finite amount (usually at least about 0.5%) but generally less than 5% by weight, oil and 3–15% by weight solids. Water removed in de-watering apparatus 26 is sent via line 28 to disposal or for further use.

The de-watered solids fraction obtained from de-watering apparatus 26 passes via line 30 into a mixing tank 32. Typically, the de-watered solids fraction removed from de-watering apparatus 26 will contain less than about 60% by weight water, preferably less than about 50% by weight water, and will also contain from about 30 to about 45% by weight solids and from about 5 to about 20% by weight oil. In addition to the de-watered solids fraction, oil is also introduced into mixing tank 32 via line 34, the amount of oil added via line 34 being sufficient to make the mixture pumpable. In mixing tank 32, the de-watered solids/oil mixture is subjected to high shear to produce a generally homogeneous slurry. A portion of the oil added to mixing tank 32, as will be seen hereafter, can be supplied via line 36 from oil recovered in subsequent processing of the de-watered solids to produce the fuel composition.

The de-watered solids/oil mixture passes via line 38 into dryer 40, described in detail hereafter. Also introduced into dryer 40 via lines 24, 42 is oil recovered from the oil fraction originally separated in centrifuge 10 to thus produce a feed charge. The amount of oil added in mixing tank 32 and in dryer 40 is such as to ensure that the amount of oil in the fuel composition ultimately produced will be in an amount of from about 30 to about 70% by weight. Dryer 40, as seen hereafter, is provided with means to effect heat exchange heating of the feed charge. Additionally, and as will be seen hereafter, dryer 40 is provided with means to induce forced convection conditions to ensure that there is no settling of solids and to aid in efficient heating of the feed charge. Preferably, the de-watered solids/oil mixture is introduced into dryer 40 at a rate that permits gentle to moderate flash vaporization of water so as to avoid any resultant carryover of solids out of dryer 40. In dryer 40, vaporization of the water plus volatile organic liquids is conducted at a temperature of from about 205° to about 220° F., the vaporized water and organic liquids passing out of dryer 40 via line 44 into condenser 46, cooling fluid being passed through condenser 46 via lines 48 and 50. The liquid condensed in condenser 46 passes via line 52 into separator tank 54, where gravity separation of the oil/water mixture takes place, the water being removed via line 56, the oil being taken via line 58 through valve 60 and either transferred via line 62 back for further processing or recycled, depending upon need, to dryer 40 via line 36.

The heat exchange heating of the feed charge in dryer 40 is continued until the desired, reduced water content is obtained, i.e., until a fuel composition containing less than about 10% by weight water, greater than 30% by weight solids (generally from about 35 to about 60% by weight solids) and from about 30 to about 70% by weight of combustible non-aqueous, generally water-insoluble liquids is obtained. In other words, the heat exchange heating in dryer 40 can be conducted until the composition disclosed in co-pending application Ser. No. 07/924,828 is obtained. The thus obtained fuel composition is recovered from dryer 40 via line 64.

Figure 2:
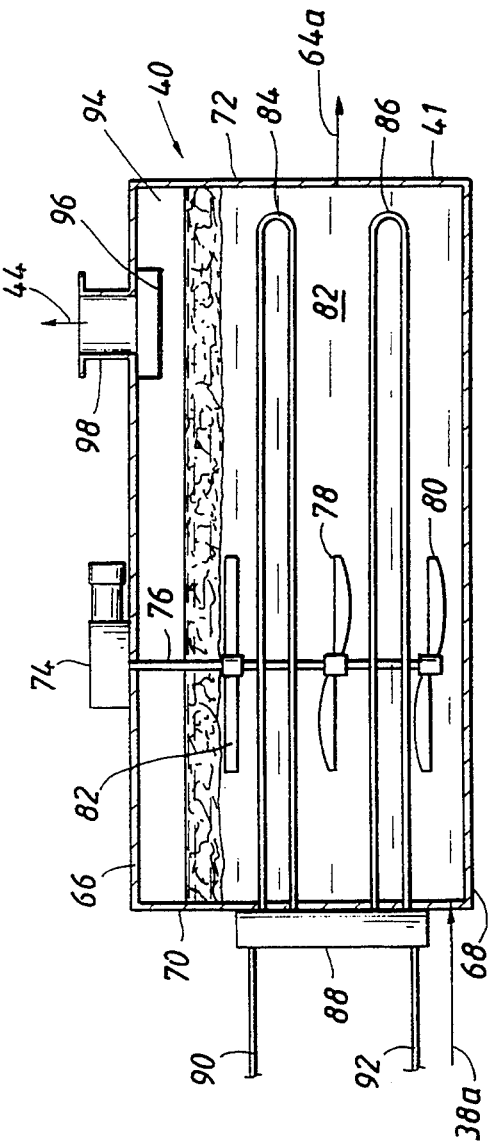
FIG. 2 is an elevational view, partly in section, showing a simplified version of a drying apparatus used in the process of the present invention.

Turning now to FIG. 2, there is shown a suitable dryer 40 for use in the process of the present invention. Dryer 40 comprises a vessel 41 having a top wall 66, a bottom wall 68, a first end wall 70 and a second end wall 72. Although not shown, it is apparent that the vessel would also have corresponding side walls thereby forming a chamber for the feed charge. Vessel 41 is provided with an inlet, shown schematically as 38a in first end wall 70, and an outlet, shown schematically as 64a, in second end wall 72. It will be appreciated that inlet 38a serves to admit de-watered solids/oil mixture from line 38 and outlet 64a serves as a discharge for the fuel composition produced in vessel 41. It will also be appreciated that, while not shown, vessel 41 would be provided with additional inlets to admit oil from lines 24, 42 shown in FIG. 1.

Mounted on the top wall 66 of vessel 41 is a motor 74 that rotatably drives a shaft 76, which projects generally vertically downwardly into the chamber formed in vessel 41. Mounted on shaft 76 for rotation therewith are first and second stirrers 78 and 80, stirrers 78 and 80 being generally vertically displaced from one another. Also mounted on shaft 76 and rotatable therewith is a beater bar 82 used to suppress foaming in vessel 41. Stirrers 78 and 80 are designed so that, as they rotate, the feed charge depicted as 82 is forced downwardly, i.e., toward bottom wall 68 to ensure that solids present in the feed charge 82 will not settle out on the bottom wall 68 of vessel 41.

Extending generally horizontally into vessel 42 are tubes 84 and 86. While only two such tubes 84, 86 are shown, it will be appreciated that a larger number of such tubes will be present, all of such tubes being generally horizontally disposed in the chamber formed by vessel 41. Tubes 84 and 86 are connected to an exterior manifold 88 that, in the conventional manner, is provided with an inlet 90 and an outlet 92 to permit the ingress and egress of a heating fluid, e.g., super-heated steam, into and out of vessel 41 via tubes 84, 86. As the feed charge 82 is heated and water evaporates, the vaporized water together with lower boiling organic components passes out of the vapor space 94 in vessel 41 through a de-mister 96 and out a vent 98 connected to line 44. It will be appreciated that virtually any configuration of vessel 41 can be employed and likewise that any arrangement of tubes to introduce heating fluid for heat exchange heating can likewise be employed. For example, vessel 41 could be generally cylindrical in nature and be provided with a series of tubes for carrying the heating fluid into and out of the cylindrical chamber that are arranged so as to form a plurality of arrays of tubes, the individual arrays of tubes defining arcs of circles, the centers of which would lie on the long axis passing through the cylindrical vessel, the vessel being disposed with its long axis generally horizontal. Obviously, the number, size and positioning of such tubes could be varied widely depending on the size and/or shape of the vessel and other such parameters. It will also be apparent to those skilled in the art that the tubes used to convey heating fluid into and out of the dryer will possess high heat transfer characteristics and will generally be as thin-walled as possible to maximize heating efficiency. Additionally, it will be recognized that only one stirrer may be necessary. For example, in the cylindrical dryer configuration described above, a single stirrer could be placed beneath the radially outermost array of tubes, i.e., closely adjacent the bottom of the cylindrical vessel, the only requirement being that the stirrer or other such mixing device adequately induce forced convection in the feed charge in a generally downward direction so as to prevent settling of solids on the lowermost portion of the dryer. In general, regardless of the configuration of the dryer as to size, shape or the like, the means used to conduct heating fluid into and out of the dryer, and the stirrer or other mixing device, the only requirement is that the dryer be capable, through heat exchange conditions, of evaporating water from the feed charge and the feed charge be subjected to forced convection so as to prevent solids settling and maximize heat transfer between the heating fluid and the feed charge.

It will be appreciated that the use of the process and apparatus depicted in FIGS. 1 and 2 provides substantial benefits in removing water from the feed charge to produce the fuel composition. Since the feed charge is under forced convection conditions, the solids and liquid are being generally homogeneously distributed throughout the interior of the vessel 41 below the vapor space. Not only does this prevent solids from settling, but it aids in efficient heat exchange with the heating fluid passing through the heat exchange tubes in vessel 41. Heat exchange heating makes use of heat sources readily available in refineries and is a highly efficient form of heating. In particular, the use of heat exchange heating can be employed because the feed charge, being a slurry, behaves essentially like a liquid. Since thermal transfer coefficients are high between two liquids on both sides of a thin metallic wall, heat exchange between the feed charge and the heated fluid in the tubes in vessel 41 is highly efficient. In particular, the apparatus and process of the present invention present a dramatic improvement over prior art technology in which a de-watered solids fraction would be dried thermally in a steam (or hot oil) screw-type dryer in which the solids fraction is heated by conduction through the screw wall and the double jacket of the dryer trough. Thermal transfer in such dryers is quite low because of the small surface contact between the cake and the heating elements. As noted, the present process and apparatus take advantage of the high thermal transfer coefficient between two liquids on both sides of a thin metallic wall, i.e., the tubes 84, 86. The apparatus and process of the present invention ensure that them is no loss of hazardous organic materials to the atmosphere since any such organics removed with the evaporated water from drying apparatus 40 are condensed and recycled, if necessary, for use in the process. Lastly, this process ensures that nowhere in the drying process do the materials reach a dry solid state, a condition known in the prior art to induce spontaneous ignition of pyrophoric species such as iron sulfides.

To more fully illustrate the present invention, the following non-limiting example is presented.

EXAMPLE

In a refinery test run, a refinery waste stream was treated according to the general process depicted in FIG. 1. The de-watering apparatus employed was a belt press. A belt press cake was obtained that contained, by weight, 53% water, 39% solids and 8% oil. The cake (de-watered solids) was introduced into a mixing tank such as mixing tank 32 containing a calculated amount of oil that had been recovered from centrifuge 10. The mixture was vigorously mixed and then pumped into a dryer such as dryer 40. The temperature was maintained in a range of from 205°–220° F. Water, as well as some volatile hydrocarbons that evaporated, was condensed. Flow into dryer 40 was controlled to ensure enough residence time to evaporate the desired amount of water. The resulting fuel composition removed from the dryer contained 9% water, 46% solids and 45% oil and was suitable for a fuel in a cement kiln.

It will be appreciated that by using the apparatus and process of the present invention, the fuel composition as disclosed and claimed in co-pending application Ser. No. 07/924,828 can be prepared efficiently and with a minimum, essentially no, loss of hazardous material to the atmosphere.

While in the process depicted in FIG. 1, the oil that is introduced into the mixer and drying apparatus is oil (organic component) that has been recovered from the waste stream in centrifuge 10, it is to be understood that the oil can be from another source, if desired. Thus, while the process of the present invention provides an efficient process for producing a fuel composition from a waste stream wherein all of the components of the fuel composition are derived from the waste stream, the process also provides a means to obtain a fuel composition wherein externally added oil (organic component) can be obtained from another source if desired, for instance, where the waste stream is deemed hazardous and meets the minimum heat value required by applicable regulations.

While the separation of the waste stream into an oil fraction, an aqueous fraction and a solids fraction can be carried out by well-known techniques such as, for example, distillation, extraction, decantation, centrifugation, filtration, etc., it is more convenient and efficient, as noted in the description of the process with reference to FIG. 1, to effect such separation by means of a high-speed, vertical disk centrifuge. Such centrifuges and techniques to effect such separations are disclosed in U.S. Pat. Nos. 4,810,393 and 4,931,176, both of which are incorporated herein by reference for all purposes.

The foregoing description and example illustrate selected embodiments of the present invention. In light thereof, variations and modifications will be suggested to one skilled in the art, all of which are in the spirit and purview of this invention.

What is claimed is:

1. A process for producing a pumpable fuel composition from a waste stream containing a liquid, organic component, water and a mixture of inorganic solids and combustible organic solids comprising:

separating said waste stream into a liquid, organic fraction, a water fraction and a solids fraction, said solids fraction comprising inorganic solids and combustible organic solids and containing from about 3 to about 15% by weight of said solids, from about 80 to about 98% by weight water and from about 0.5 to about 5% by weight oil;

removing water from said solids fraction to produce a de-watered solids fraction containing less than about 60% by weight water;

admixing said de-watered solids fraction with oil to produce a feed charge; and heating said feed charge using heat exchange conditions at a temperature and for a time sufficient to evaporate water and produce a pumpable fuel composition comprising less than about 10% by weight water, greater than about 30% by weight solids, and from about 30 to about 70% by weight oil.

2. The process of claim 1 wherein said waste stream is separated into said liquid, organic fraction, said water fraction and said solids fraction by centrifugation using a high-speed, vertical-disc centrifuge.

3. The process of claim 1 wherein said oil is oil that has been recovered from said waste stream.

4. The process of claim 1 wherein said waste stream comprises from about 5 to about 80% by weight liquid, organic components, from about 10 to about 95% by weight water and from about 1 to about 30% by weight solids.

5. The process of claim 1 wherein said waste stream comprises a refinery waste stream.

* * * * *